United States Patent [19]
Koenig et al.

[11] Patent Number: 5,586,178
[45] Date of Patent: Dec. 17, 1996

[54] INTERFACE FOR AUTOMATIC CALL DISTRIBUTOR FOR PERFORMING AGENT FUNCTIONS VIA HOST COMPUTER

[75] Inventors: Peter J. Koenig, Lisle; David L. Blaha, Aurora, both of Ill.

[73] Assignee: Rockwell International Corporation, Seal Beach, Calif.

[21] Appl. No.: 315,047

[22] Filed: Sep. 29, 1994

[51] Int. Cl.$^6$ .......................... H04M 3/00; H04M 11/04; H04M 15/00

[52] U.S. Cl. .............. 379/265; 379/45; 379/127; 379/309

[58] Field of Search .............................. 379/45, 48, 49, 379/265, 266, 309, 210, 212, 214, 127, 142

[56] References Cited

U.S. PATENT DOCUMENTS

| | | | |
|---|---|---|---|
| 4,893,325 | 1/1990 | Pankonen et al. | 379/265 X |
| 5,392,329 | 2/1995 | Adams et al. | 379/49 |

*Primary Examiner*—Krista M. Zele
*Assistant Examiner*—Harry S. Hong
*Attorney, Agent, or Firm*—C. B. Patti; G. A. Montanye; S. R. Hewitt

[57] ABSTRACT

An interface (204) for an automatic call distributor (102) which connects incoming telephone calls to selected ones of a plurality of agents provides communications with a host computer (108). An agent (112) communicates to the automatic call distributor (102) through a host terminal (104) connected to the host computer (108). The interface (204) permits the agent (112) to request the assistance of a supervisor (116), to initiate an emergency and to repeat an announcement. The interface (204) receives signals from the host computer (108) via a data link (110). The signals being representative of the desired function requested by the agent (112). The interface (204) conditions the signals for proper receipt by the automatic call distributor (102) such that the automatic call distributor (102) performs the requested function.

17 Claims, 3 Drawing Sheets

INTERFACE FOR AUTOMATIC CALL DISTRIBUTOR FOR PERFORMING AGENT FUNCTIONS VIA HOST COMPUTER

BACKGROUND OF THE INVENTION

The present invention relates generally to automatic call distributors and, more particularly, to an interface for interconnecting an automatic call distributor and a host computer such that an agent may activate a supervisor assistance function, an emergency function and a repeat of announcement function from the host computer.

In an effort to solicit new customers and maintain existing customers, businesses are continually striving to improve customer service. An important part of customer service is the business' ability to efficiently handle customer orders, complaints, and the like over the telephone. Accordingly, businesses are increasingly using automatic call distributors (ACDs) to route incoming telephone calls to the appropriate agents.

An ACD typically consists of a multiport switch which routes calls to one or more available agents under the control of a central processing unit. Each of the agents has access to an agent console connected to the central processing unit of the ACD. The agent console generally includes a numeric keypad and a few special function pushbuttons. An agent might use, for example, a special function pushbutton to release a connected call, place a call on hold or remove a call from hold.

Typically, a host computer communicates with the ACD via a data link. The host computer stores data relating to relevant information about customers. For instance, the data may include customer name, customer account number, customer social security number or the like.

In operation, the ACD obtains information identifying an external caller, such as an account number. The ACD transmits the account number to the host mainframe computer and concomitantly routes the call to a selected agent. Before the selected agent answers the call, the host mainframe computer finds the account number in the appropriate database and transmits the information corresponding to the account number to a host terminal positioned near the selected agent. The host terminal generally comprises a display device and an input device, such as a keyboard. The agent thereby has access to the customer's information prior to and during the telephone call.

In an effort to permit the agent to perform functions via the host terminal, manufacturers are continually developing improved interfaces for interfacing the ACD with the host mainframe computer and the host terminals. The interfaces permit an agent to control certain functions of the ACD operation via a host terminal.

With current interfaces, an agent unfortunately cannot perform all of the functions via the host computer terminal. An agent must, therefore, still utilize the agent console to perform some functions. Alternating continually between the host terminal and the agent console is burdensome, wastes agent time and likely increases job-related stress. Accordingly, the industry continues to search for improved interfaces which permit more and more functions to be performed by an agent via a host terminal and, eventually, totally eliminate the need for an agent console.

For the foregoing reasons, there is a need for an improved interface for providing communications between an ACD and a host terminal which permits additional functions to be performed by an agent via the host terminal and, in particular, an interface which permits an agent to activate a supervisor assistance function, an emergency function and a repeat of announcement function from the host terminal.

SUMMARY OF THE INVENTION

This need is met by the interface for an automatic call distributor in accordance with the present invention wherein a supervisor assistance function, an emergency function and a repeat of announcement function may be performed by an agent via a host terminal.

In accordance with one aspect of the present invention, an interface comprises transport means for receiving a supervisor signal from a host computer connected to a host terminal. The supervisor signal is comprised of a supervisor request code which indicates that an agent requests the assistance of the supervisor. The transport means maps the supervisor signal to a console control address for activating presentation means. The presentation means then uses the supervisor request code to activate software applications in the automatic call distributor such that the automatic call distributor indicates to the supervisor that the agent requests assistance.

In accordance with another aspect of the present invention, an interface comprises transport means for receiving an emergency signal from a host computer connected to a host terminal. The emergency signal is comprised of an emergency request code which indicates that an agent wishes to initiate an emergency. The transport means maps the emergency signal to a console control address for activating presentation means. The presentation means then uses the emergency request code to activate software applications in the automatic call distributor such that the automatic call distributor initiates an emergency.

DETAILED DESCRIPTION OF THE INVENTION

Figure 1:
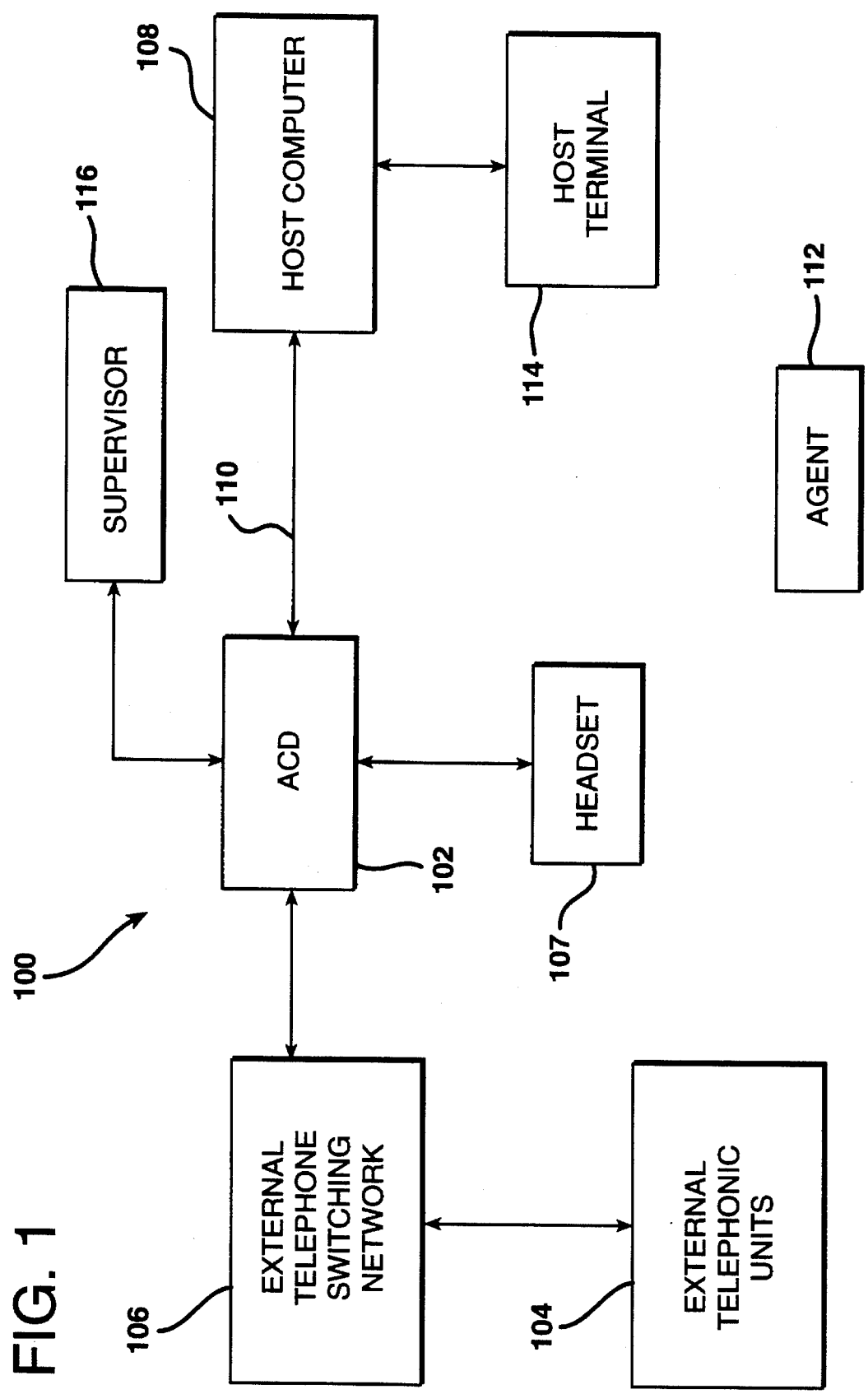
FIG. 1 is a block diagram of a telephone switching system including an automatic call distributor, a host computer and a host terminal in accordance with the present invention.

A telephone switching system 100 comprising an automatic call distributor 102 in accordance with the invention is shown in FIG. 1. The automatic call distributor (ACD) 102 receives incoming telephone calls from external telephonic units 104 via an external telephone switching network 106. Each of the incoming telephone calls is routed by the ACD 102 to a selected one of a plurality of agents through a headset 107. Automatic call distributors and, more particularly, methods for routing incoming telephone calls to selected ones of a plurality of agents are well known. Examples of such ACDs are disclosed in U.S. Pat. No. 5,268,903, issued to Jones et al., entitled "Multichannel Telephonic Switching Network With Different Signaling Formats and Connect/PBX Treatment Selectable For Each Channel", issued on Dec. 7, 1993 and U.S. Pat. No. 5,140,611, issued to Jones et al., entitled "Pulse Modulated Self-Clocking and Self-Synchronizing Data Transmission and Method for a Telephonic Communication Switching System", issued on Aug. 18, 1992, the disclosures of which are hereby incorporated by reference.

The ACD 102 and a host computer 108 exchange commands and status information over a data link 110. The signals which are transmitted between the ACD 102 and the host computer 108 are preferably digital signals. An agent 112 uses a host terminal 114 to communicate with the ACD 102 via the host computer 108. Historically, it would be necessary for the agent 112 to also have access to an agent console connected to the ACD 102 in order to transmit at least some types of instructions to the ACD 102.

Figure 2:
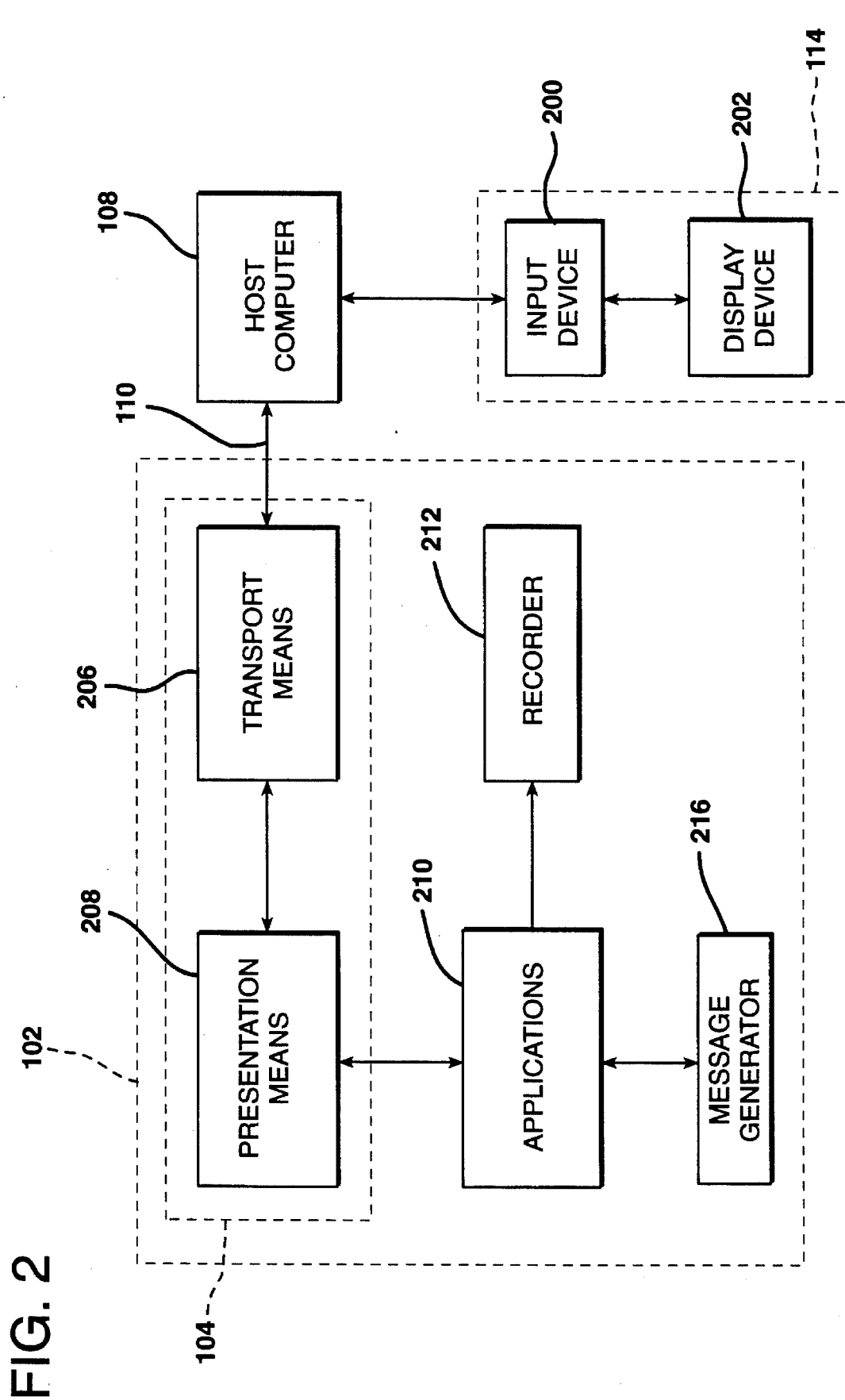
FIG. 2 is a schematic block diagram showing in detail the automatic call distributor and the host terminal shown in FIG. 1.

In view of this, ACD manufacturers are continually developing improved interfaces for communicating between the ACD 102 and the host computer 108 such that agents are able to perform more and more functions via the host terminal 114. The host terminal 114 is preferably comprised of an input device 200, such as a keyboard, and a display device 202, such as a cathode ray tube (CRT), both of which are shown in FIG. 2.

As is well known in the art, information is sent to the agent 112 before, during and after an incoming telephone call. For example, account information, call type, the city from which the call has originated and the like may be sent to the agent 112 prior to answering a telephone call. The city from which the call has originated is detected by the ACD 102 in any of a number of well known manners, such as through conventional Automatic Number Identification (ANI).

An announcement generator 216 generates audio announcements for transmission to the headset 107. Visual announcements are generated by the host computer 108 for display on the display device 202. The host computer 108 typically stores information relating to existing customers or potential customers which may be transmitted to the display device 202 for use by the agent 112.

Having this information, the agent 112 is able to quickly and efficiently handle the call without unnecessarily gathering information from the caller. Methods for presenting information to the agent are well known in the art and, therefore, will not be further discussed herein. One such method is disclosed in U.S. Pat. No. 5,097,258, issued to Gursahaney et al. and entitled "System for Integrating Telephony Data With Data Processing Systems", the disclosure of which is hereby incorporated by reference.

A detailed block diagram of an interface 204 for providing communications with the host computer 108 in accordance with the present invention is shown in FIG. 2. The interface 204 comprises transport means 206 for receiving signals from the host computer 108 and presentation means 208 for controlling applications 210 in response to the transport means 206. The applications 210 are various software programs which control the operation of the ACD 102. A conventional recorder 212 records selected telephone calls upon request by the agent 112 or a supervisor 116. It should be further understood that the transport means 206 and the presentation means 208 comprise one or more software programs for processing signals received from the host computer 108.

ACD manufacturers have continually attempted to design improved interfaces which permit agents to perform additional functions from the host terminal 114. Unfortunately, agents have been previously unable to perform all of their functions via the host terminal 114. Agents have thus been required to use a separate agent console to perform such functions as initiating an emergency, obtaining assistance from a supervisor and repeating announcements. As should be readily apparent, continually switching between the host terminal 114 and the agent console is unduly burdensome. The interface 204 in accordance with the present invention permits the agent to initiate an emergency, obtain assistance from a supervisor and repeat announcements via the host terminal 114.

Each of these functions will now be described with reference to FIG. 3. It should be understood that the interface 204 has been designed for implementation in a Galaxy Model 3000E Automatic Call Distributor manufactured by Rockwell International. However, the present invention may be readily implemented in a number of different ACDs by those skilled in the art.

During a telephone call, the agent 112 may desire the assistance of the supervisor 116 for any number of reasons. The agent 112 signals to the host computer 108 by means of the input device 200 of the host terminal 114 that the assistance of the supervisor 116 is requested. The keyboard keys which initiate the supervisor assist function is determined by computer programs resident in the host computer 108. Since the keying sequence is not important to the present invention beyond prompting the host computer 108 to send the appropriate signal to the ACD 102, the keying sequence will not be further discussed herein.

In response to the agent's request, the host computer 118 generates a supervisor signal which is transmitted to the transport means 206 of the interface 204. The supervisor signal, which is preferably digital, is comprised of a record type, a position identification code and a request code.

The record type is used by the transport means 206 to activate the presentation means 208. The position identification code uniquely identifies the agent who requested the assistance or the host terminal from which the request was made. The request code indicates the function that is to be performed by the ACD 102.

Figure 3:
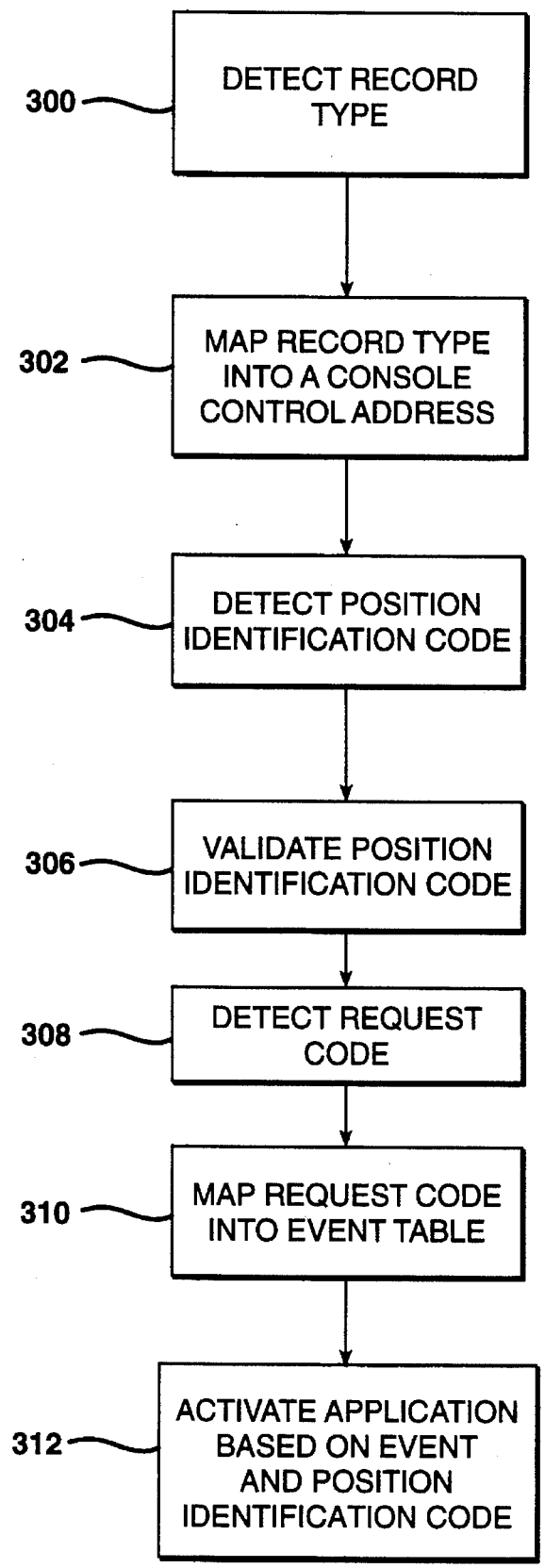
FIG. 3 is a flow chart of the preferred steps in accordance with the present invention.

Referring to FIG. 3, the transport means 206 receives the supervisor signal and detects the record type, at step 300. At step 302, the transport means 206 maps the record type to a console control address. The presentation means 208 comprises a software routine associated with the console control address. This software routine processes the supervisor signal.

The software routine of the presentation means 208 next decodes the position identification code to uniquely identify the agent who requested assistance or the host terminal from which assistance was requested at step 304. The decoded position identification code is then checked for validity at step 306. For example, the decoded position identification code may be checked against a list of allowable codes.

The presentation means 208 detects the request code, or command code, which is representative of the function to be performed. As noted in the design description set forth below, the supervisor assistance function has a "7" as a request code. The presentation means 208 then selects an event code in an event table based on the request code at step 310. At step 312, the event code and the position identification code are used to activate at least one application in the automatic call distributor 102 to alert the supervisor 106 that the agent 112 needs assistance. The supervisor 116 may be notified by any of a number of well known manners. For example, a light on the supervisor's telephone may flash until the supervisor assists the agent.

In accordance with the invention, the agent 112 is able to initiate an emergency from the host terminal 114. Nuisance, threatening and emergency calls are a few of the instances where the agent 112 would likely initiate an emergency.

ACDs use a conventional recording device, such as the recorder 212, to record the telephone calls in an emergency. An ACD which uses a recorder to record telephone calls is disclosed in commonly assigned U.S. application Ser. No. 07/966,989, filed Oct. 27, 1992 and entitled "Automatic Call Distributor System With Emergency Recording System and Method".

In the event of an emergency, the agent 112 signals to the host computer 108 by means of the input device 200 of the host terminal 114 that the call should be recorded. The host computer 108 generates an emergency signal indicating that the agent 112 has an emergency for transmission to the transport means 206 in the ACD 102. Similar to the supervisor signal, the emergency signal comprises a record type, a position identification code and a request code.

The transport means 206 detects the record type and maps the emergency signal to the console control address. The software routine of the presentation means 206 then detects the position identification code of the agent 112 and validates the position identification code as noted above. The request code for an emergency is "8" as shown below in the design description. The presentation means 208 then maps the request code to the event table to obtain an event corresponding to an emergency. The event is then used to activate at least one of the applications 210 to initiate an emergency. The at least one application 210 preferably activates the recorder 212 to record the telephone call upon initiating the emergency. In addition, the at least one application 210 may also signal the supervisor 116 that an emergency has been initiated.

As noted above, various audible and visual announcements are sent to the agent 112 concerning the incoming caller. The agent 112 may, however, be preoccupied and miss the announcements. The agent must then request that the announcement be repeated. In current ACD systems, the agent console contains a repeat announcement key for automatically repeating an announcement. The present invention provides the repeat announcement function via the host terminal 114.

The agent 112 initiates the repeat announcement function from the input device 200 of the data terminal 114. In response, the host computer 108 generates a repeat signal which is transmitted to the transport means 206 of the ACD 102. Similar to the supervisor and emergency signals, the repeat signal comprises a record type, a position identification code and a request code. Based on the record type, the transport means 206 activates the software routine of the presentation means 208. The presentation means 208 detects and validates the position identification code. If the position identification code is valid, the presentation means 208 maps the request code, which is a "9" for repeat announcement in the design description contained at the end of this specification, into an event code. The event code is then used to activate at least one application such that the ACD 102 repeats the announcement to the agent 112.

A design description describing one embodiment of the present invention is set forth below.

```
;****************************************************************
;
; ROUTINE NAME: Console_Control_Request
;
; ROUTINE DESCRIPTION:
;       This routine handles the receipt of a Console Control Request
;       message. It validates the Position and Type of Request. If all is
;       valid, then based on the command code, generates one of the following
;       events to processing via call processing. A response message is always
;       sent to the DBS.
;
;           Command Code    Event       Action
;           ------------    -----       ------
;                1          BONHLD      Place Party B on Hold
;                2          CONHLD      Place Party C on Hold
;                3          BOTHON      Place both parties on hold
;                4          FRWRD       Split forward (B on hold, C off hold)
;                5          BACK        Split back (B off hold, C on hold)
;                6          THRPTY      Three Party Conference (Take all parties
;                                       off hold)
;                7          SUP         Supervisor Assistance
;                8          EMY         Emergency
;                9          RPT         Repeat the gate announcement
;
; ENTRY CONDITIONS: NONE
;
;
; EXIT CONDITIONS:    If all checked elements are valid an event is generated
;                     to agent or gate PBX processing.
;
;                     A response message is always sent to the DBS.
;
; INPUTS:      POSTID    - Position id
;              CMDCOD    - Command Code (1-9, Type of Request)
;              PHYLOG    - Physiscal/Logical link
;
; OUTPUTS: NONE
;****************************************************************
PROCEDURE Console_Control_Request
        INPARM    Position id
        INPARM    Command Code
        INPARM    Physical/Logical link
```

```
            ATTR       GLOBAL
BEGIN
        Get and isolate the logical link
        INPARM       Position ID
        INPARM       #GPAGT - Position Device Type
        INPARM       Physical/Logical link
        OUTPARM      R4 - Agent Port ID/Gate ID
        OUTPARM      (SP) + - Position Term Table
        CALL VDEVI CCODE to validate the position
        IF the termination is an agent or gate PBX
        THEN
            IF  command code is valid
            THEN
                zero origin command code
                Make it a word offset
                Retrieve event to send in R3
                Isolate it
                CALL CAGE to generate the event to processing
                IF  the even not processed
                THEN
                    Set Request not valid at this time in R3
                ELSE the event was processed
                    Set Request Successfully processed in R3
                ENDIF
            ELSE the command code was invalid
                Set invalid command code R3
            ENDIF
        ELSE the extension was invalid
            Set Termination not an agent or gate PBX in R3
        ENDIF
        If the response code in R3 is equal to a successful process
        THEN
            Retrieve the command code
            Make it a word offset
            If the transmit bit is set in the command table for the command entry
            THEN
                INPARM       Position id
                INPARM       Physical and Logical Link
                CALL         Console_Control_Positive_Response_Generator_with_
                             Link_ID to send the position control response message
            ENDIF
        ELSE there was an error of some kind
            INPARM       Position Id
            INPARM       R3 - Response Code
            INPARM       Physical and Logical Link
            CALL         Console_Control_Negative_Response_Generator_with_
                         Link_ID to send the position control response message
        ENDIF
        RETURN
ENDPR
```

Having thus described the invention in detail by way of reference to preferred embodiments thereof, it will be apparent that other modifications and variations are possible without departing from the scope of the invention defined in the appended claims. For example, the ACD may have design configurations which depart from those described herein. Further, alternative request codes may be employed than those disclosed herein.

What is claimed is:

1. In an automatic call distributor, an interface for providing communications with a host computer, the automatic call distributor being capable of selectively connecting incoming telephone calls to a plurality of agents, at least one of the agents being a supervisor, the interface comprising:

transport means for receiving a supervisor signal from the host computer, the supervisor signal comprising a supervisor request code indicating that an agent requests assistance from the supervisor, and for mapping the supervisor signal to a console control address; and presentation means responsive to the console control address for activating at least one application in the automatic call distributor based on the supervisor request code such that the automatic call distributor signals the supervisor.

2. The interface as recited in claim 1 wherein the supervisor signal comprises a position identification code which uniquely identifies the agent who requested assistance, and wherein the presentation means decodes the supervisor signal to identify the agent who requested assistance based on the position identification code.

3. The interface as recited in claim 2 wherein the presentation means validates the position identification code.

4. The interface as recited in claim 1 wherein the transport means receives an emergency signal from the host computer, the emergency signal comprising an emergency request code indicating that an agent has an emergency, and for mapping the emergency signal to the console control address, and wherein the presentation means decodes the emergency signal and activates at least one application in the automatic call distributor to initiate the emergency based on the emergency request code.

5. The interface as recited in claim 4 wherein the at least one application in the automatic call distributor activates a recorder to record a telephone call upon initiating the emergency.

6. The interface as recited in claim 4 wherein the automatic call distributor signals a supervisor upon initiating an emergency.

7. The interface as recited in claim 4 wherein the emergency signal comprises a position identification code which uniquely identifies the agent who has the emergency, and wherein the presentation means decodes the emergency signal and uniquely identifies the agent who has the emergency based on the position identification code.

8. In an automatic call distributor, an interface for providing communications with a host computer, the automatic call distributor being capable of selectively connecting incoming telephone calls to a plurality of agents, generating an announcement concerning each telephone call, and providing each announcement to an agent prior to connecting the agent to the telephone call, the interface comprising:

transport means for receiving a repeat signal from the host computer, the repeat signal comprising a repeat request code indicating that an agent requests a repeat of the announcement, and for mapping the repeat signal to a console control address; and presentation means responsive to the console control address for decoding the repeat signal and for activating at least one application in the automatic call distributor based on the repeat request code such that the announcement is repeated to the agent.

9. The interface as recited in claim 8 wherein the transport means receives a supervisor signal from the host computer, the supervisor signal comprising a supervisor request code indicating that an agent requests assistance from the supervisor, and maps the supervisor signal to the console control address, and wherein the presentation means decodes the supervisor signal and activates at least one application in the automatic call distributor based on the supervisor request code such that the automatic call distributor signals the supervisor.

10. The interface as recited in claim 9 wherein the transport means receives an emergency signal from the host computer, the emergency signal comprising an emergency request code indicating that an agent has an emergency, and maps the emergency signal to the console control address, and wherein the presentation means decodes the emergency signal and activates at least one application in the automatic call distributor based on the emergency request code such that the automatic call distributor initiates the emergency.

11. The interface as recited in claim 10 wherein the automatic call distributor comprises a recorder for recording a telephone call in response to the at least one application initiating the emergency.

12. The interface as recited in claim 10 wherein the automatic call distributor signals a supervisor upon initiating an emergency.

13. In an automatic call distributor, an interface for communicating with a host computer, the automatic call distributor being capable of selectively connecting incoming telephone calls to a plurality of agents, the interface comprising:

transport means for receiving an emergency signal from the host computer, the emergency signal comprising an emergency request code indicating that an agent has an emergency, and for mapping the emergency signal to a console control address; and presentation means responsive to the console control address for decoding the emergency signal and for activating at least one application in the automatic call distributor based on the emergency request code such that the automatic call distributor initiates the emergency.

14. The interface as recited in claim 13 wherein the automatic call distributor comprises a recorder for recording a telephone call upon initiating the emergency.

15. The interface as recited in claim 14 wherein the automatic call distributor signals a supervisor upon initiating the emergency.

16. The interface as recited in claim 13 wherein the emergency signal comprises a position identification code which uniquely identifies the agent who has the emergency, and wherein the presentation means identifies the agent who requested assistance upon decoding the emergency signal based on the position identification code.

17. The interface as recited in claim 16 wherein the presentation means validates the position identification code.

* * * * *